(12) United States Patent
Le et al.

(10) Patent No.: US 6,781,266 B2
(45) Date of Patent: Aug. 24, 2004

(54) DISTORTION FREE LASER WELDED FLUID BEARING DESIGN

(75) Inventors: Lynn Bich-Quy Le, San Jose, CA (US); Donald J. Macleod, Scotts Valley, CA (US); Anthony J. Aiello, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/894,475

(22) Filed: Jun. 27, 2001

(65) Prior Publication Data

US 2002/0053846 A1 May 9, 2002

Related U.S. Application Data

(60) Provisional application No. 60/247,097, filed on Nov. 9, 2000.

(51) Int. Cl.⁷ .................................................. H02K 7/08
(52) U.S. Cl. ........................................ 310/90; 310/90.5
(58) Field of Search ................................... 310/90.5, 90

(56) References Cited

U.S. PATENT DOCUMENTS

| | | | |
|---|---|---|---|
| 3,704,636 A | 12/1972 | Piech | 228/174 |
| 3,747,963 A | 7/1973 | Shivak | 285/336 |
| 4,643,346 A | 2/1987 | Gotoh | |
| 4,913,337 A | 4/1990 | Gotoh | |
| 5,168,142 A | 12/1992 | Gartner et al. | 219/121.64 |
| 5,211,327 A | 5/1993 | Clarke et al. | 228/174 |
| 5,653,540 A * | 8/1997 | Heine et al. | 384/123 |
| 5,744,882 A * | 4/1998 | Teshima et al. | 310/67 R |
| 6,305,439 B1 * | 10/2001 | Pool et al. | 141/4 |
| 6,343,877 B1 * | 2/2002 | Miura et al. | 384/100 |

\* cited by examiner

*Primary Examiner*—Dang Le
*Assistant Examiner*—Nguyen N Hanh
(74) *Attorney, Agent, or Firm*—Raghunath S. Minisandram; Jesus Del Castillo

(57) ABSTRACT

The counterplate and/or sleeve are modified to reduce or eliminate distortion in the counterplate in a laser welded fluid bearing design. It is known to directly weld the counterplate which lies across the end of the shaft and the thrust plate to a wall or shoulder of the sleeve in which the counterplate is fit. The radial stiffness of the sleeve is weakened by cutting grooves or the like at or near the interface between the sleeve wall and the counterplate, or on the outer diameter of the sleeve wall to essentially weaken the sleeve wall. This weakening of the sleeve wall prevents bowing or distortion of the counterplate being imposed by the sleeve.

20 Claims, 7 Drawing Sheets

DISTORTION FREE LASER WELDED FLUID BEARING DESIGN

CROSS-REFERENCE TO RELATED APPLICATIONS

This application claims benefit of U.S. Provisional Application No. 60/247,097, entitled DISTORTION FREE LASER WELDED FLUID BEARING DESIGN, filed Nov. 9, 2000 by Le et al., which is hereby incorporated by reference in its entirety.

FIELD OF THE INVENTION

The invention relates to the field of hydrodynamic bearing assemblies of the type that cooperates with high-speed spindle elements. More specifically, the invention relates to a design that reduces stress and distortion in parts which are incorporated into a hydrodynamic bearing.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside a hub that supports the discs. One type of motor in common use is known as an in-hub or in-spindle motor. Such in-spindle motors typically have a spindle mounted by means of two ball or hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

The use of hydrodynamic bearing assemblies in such drive systems has become preferred due to desirable reductions in drive size and noise generation as compared to conventional ball bearing drive systems. In hydrodynamic bearings, a lubricating fluid, such as oil or air, functions as the bearing surface between a base or housing and a spindle or hub. As the lubricating fluids require small gaps between the stationary and rotating members in order to provide the support, stiffness and lubricity required for proper bearing operation, conventional drive components and assemblies typically require tight tolerances and demand precision assembly methods. Such demanding tolerance and assembly control results in increased part and assembly costs along with an increased level of quality control to ensure proper drive operation.

Thus, the problem presented is to reliably set close bearing gaps without requiring excessive or burdensome part or manufacturing tolerances.

However, a related problem arises from the fact that to maintain the integrity of the thrust plate style hydrodynamic bearing, the technology has adopted the approach of laser welding the counterplate which overlies the thrust plate and is supported adjacent the thrust plate an upraised wall of the sleeve. This seals the fluid dynamic bearing, maintaining the fluid within the bearing without the necessity of using an o-ring or the like between the counterplate and sleeve to prevent any loss of fluid. However, thermal contraction forces caused by cooling of the weld nugget cause the counterplate to bow (typically outward), which may increase the gap between thrust plate and counterplate and thereby impact stiffness and wear contact conditions for the thrust bearing. Therefore, the problem presented is to adopt a design which eliminates or diminishes the bowing of the counterplate during welding.

SUMMARY OF THE INVENTION

The present invention seeks to provide a method and apparatus for eliminating bowing or other distortion of the counterplate incorporated into a thrust plate design hydrodynamic bearing.

More specifically, the present invention seeks to improve the method of welding the counterplate to the surrounding supporting sleeve by making the effect on the counterplate substantially distortion free.

In summary, according to the present invention, the counterplate and/or sleeve are modified to reduce or eliminate distortion in the counterplate in a laser welded fluid bearing design. More specifically, according to the present invention, which comprises a shaft with a thrust plate at one end, surrounded by a sleeve, and a counterplate supported in the sleeve adjacent the thrust plate to define a gap with the thrust plate. It is known to directly weld the counterplate which lies across the end of the shaft and the thrust plate to a wall or shoulder of the sleeve in which the counterplate is fit. According to the invention, the radial stiffness of the sleeve is weakened by cutting grooves or the like at or near the interface between the sleeve wall and the counterplate, or on the outer diameter of the sleeve wall to essentially weaken the sleeve wall. This weakening of the sleeve wall prevents bowing or distortion of the counterplate being imposed by the sleeve.

More specifically, in one embodiment, the distortion is eliminated by cutting a groove at the interface of counterplate and sleeve. The groove may be solely in the sleeve shoulder or may also intrude into the counterplate. In a preferred embodiment, the depth is about half of the counterplate thickness.

In yet another alternative embodiment, a groove is cut on the sleeve outer diameter inward toward the counterplate, approximately radially parallel with the counterplate. In yet another approach, the sleeve may simply cut away at the axially or grooved and radical outer end of the shoulder which supports the counterplate.

In yet a further alternative embodiment, an undercut may be imposed on the inner surface of the sleeve shoulder at or near where a corner of the counterplate would rest against the sleeve shoulder.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
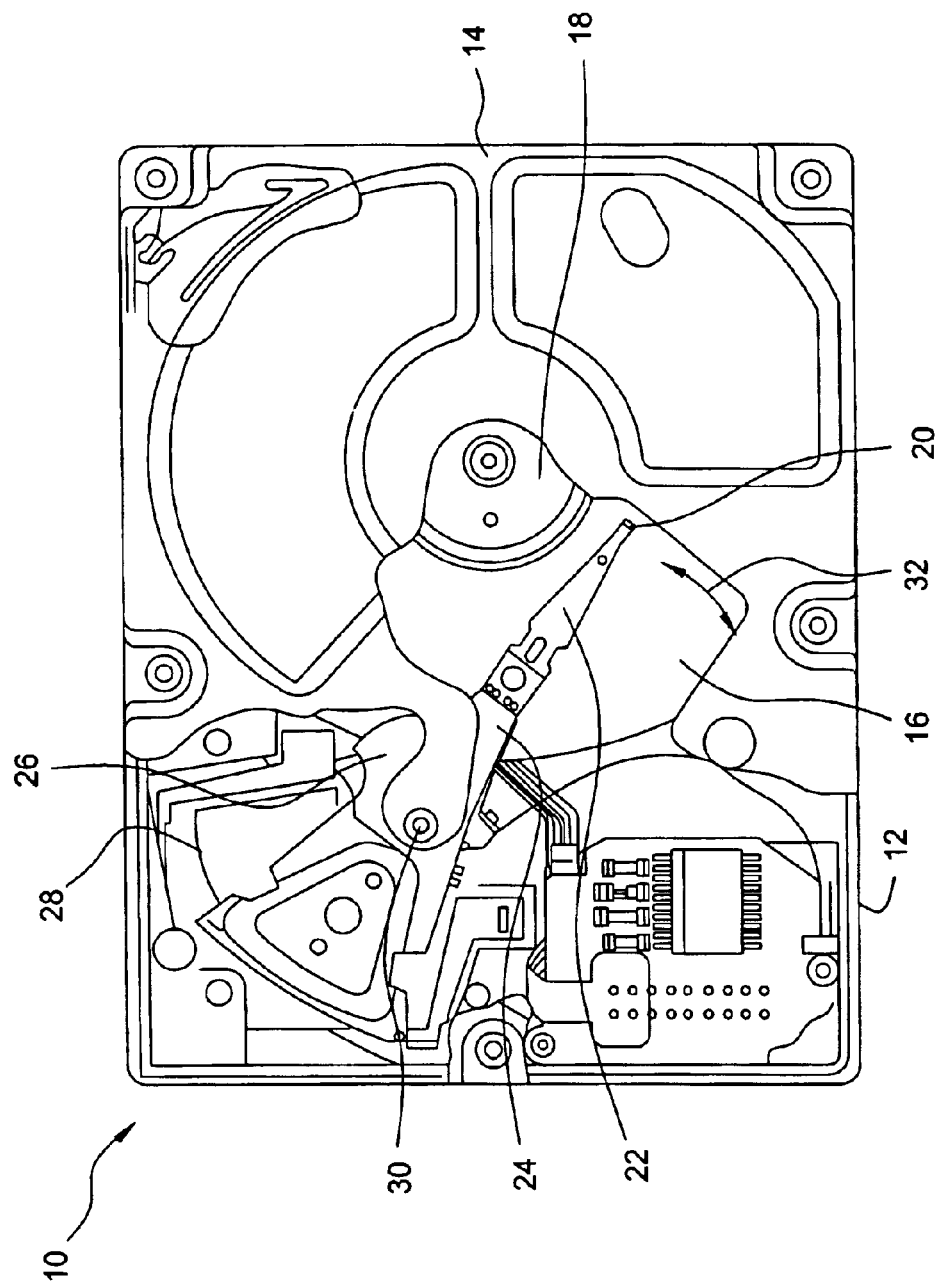
FIG. 1 is a top plan view of a disc drive data storage device, in accordance with the invention.

The invention comprises a spindle motor for a disc drive data storage device having a thrust plate type hydrodynamic bearing. FIG. 1 is a plan view of a typical disc drive 10 wherein the invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

Disc drive 10 further includes a disc pack 16 that is mounted for rotation on a spindle motor (not shown) by a disc clamp 18. Disc pack 16 includes one or more individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
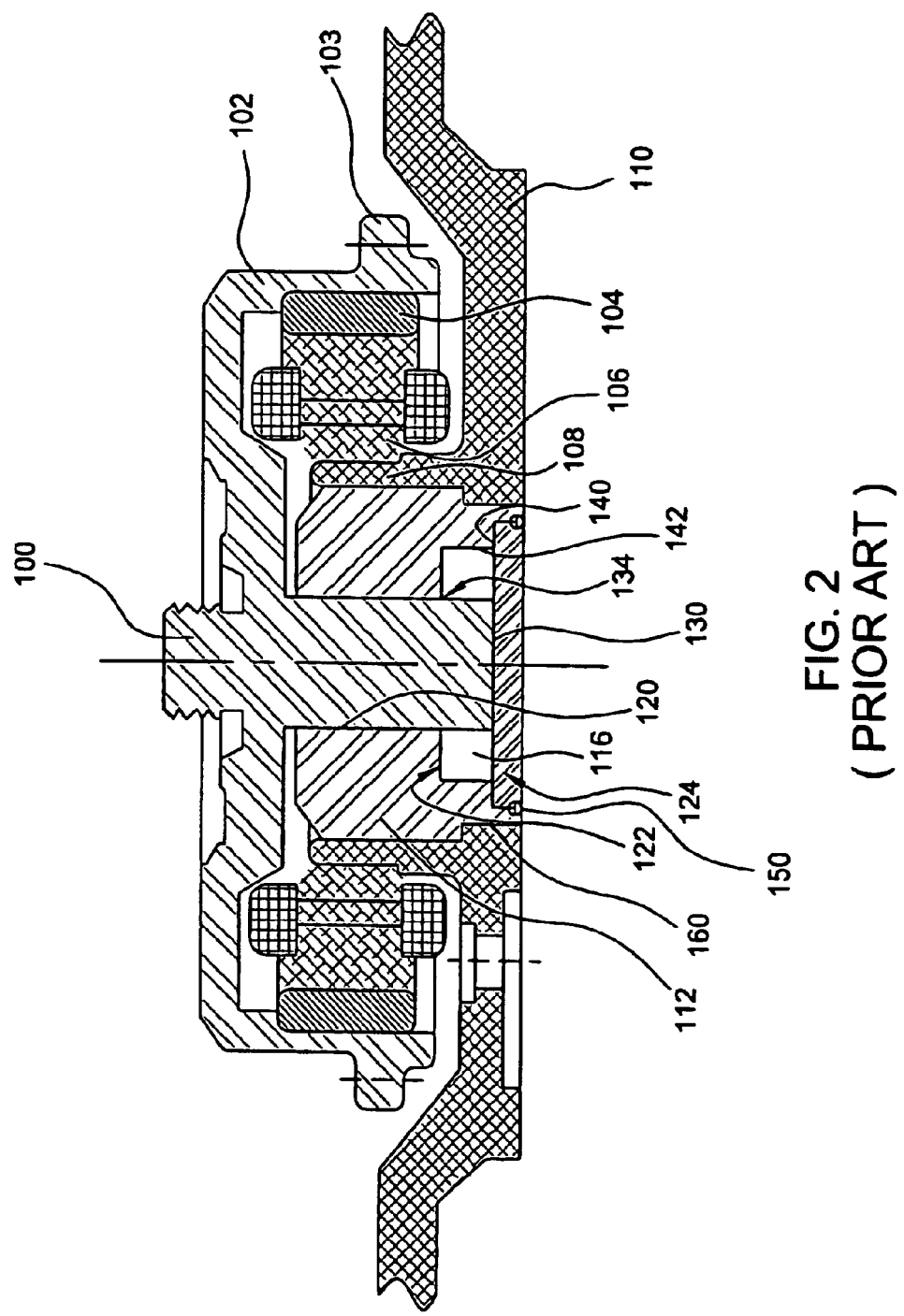
FIG. 2 is a vertical sectional view of a typical disc drive spindle motor in which the present invention is especially useful.

FIG. 2 shows a rotating shaft 100 spindle motor design in which the shaft 100 is integrated with the hub 102 which carries flange 103 which functions as a disc support surface. The shaft 100 with the hub 102 supports a magnet 104 on its inner axial surface, facing stator 106 whose energization causes stable rotation of the hub. The stator 106 in turn is supported on an axial extension 108 of base casting 110. A sleeve 112 which supports the shaft 100 and its associated thrust plate 116 is incorporated into the axial extension 108 of the base 110. This sleeve 112 has axial surface 120 that faces a surface of the shaft 100. These two surfaces define a journal bearing which is of standard design and not further shown. Further, the thrust plate 116 at surfaces 122 and 134 define in cooperation with the sleeve 112 and the counterplate 130 thrust bearings of the fluid dynamic type which further support the shaft 100 against axial forces. Each of these journal 120 and thrust 122, 134 bearings require fluid in the gaps between the facing surfaces. This fluid may either recirculate through the thrust bearing 134 which either passes through the thrust plate 116 or between the thrust plate 116 and shaft 100, or through a central bore (not shown). To prevent the escape of any fluid between the surface 140 of the sleeve 100 and the complementary surface 142 of the counterplate 130, a laser weld has been applied at the junction at the axially outer edge of the counter plate 130 and the sleeve 112. This laser weld is applied using well-known techniques and technology but by its very simplicity enhances the reliability.

Given the welded counterplate to sleeve shoulder scheme of FIG. 2, this effectively seals the hydrodynamic bearing fluid. However, thermal contraction forces caused by cooling of the weld nugget at the seam along the counterplate/sleeve interface results, under certain circumstances, in a bowing of the counterplate 130. This bowing can increase the gap which is intended to be carefully defined between the counterplate and sleeve, thereby impacting the stiffness and wear contact conditions of the thrust bearing.

Figure 3A:
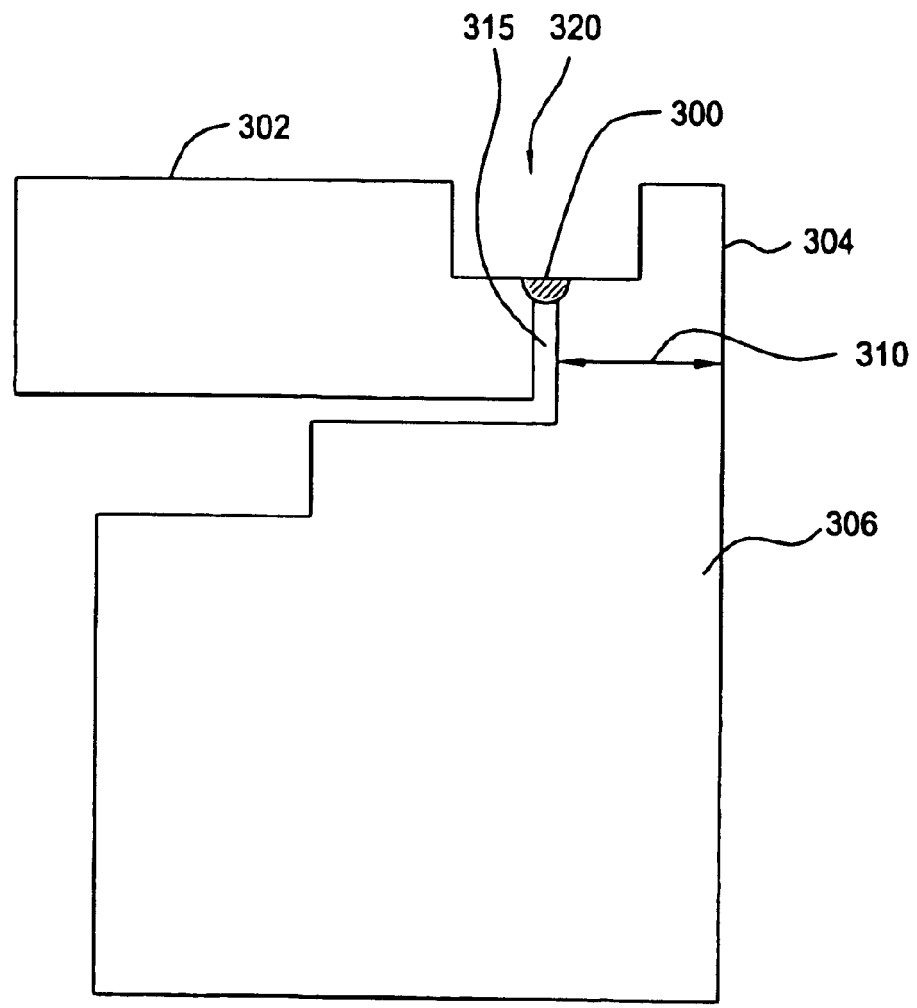
FIGS. 3A, 3B, 4A, 4B and 5 are vertical sectional views of alternative embodiments of this invention.

The succeeding figures show a plurality of solutions to eliminate counterplate distortion from fluid bearing design due to laser welding. Referring for example to FIG. 3A, we see an example wherein a groove 320 is cut at the weld interface 300 into both the counterplate 302 and the radially inner edge of the shoulder 304 of sleeve 306. Preferably, the groove depth should be about half of the counterplate thickness. Further, as is shown, the radial width of the groove 320 as cut into the shoulder 304 is about half of the total width 310 of the sleeve 306. Testing has demonstrated that this is highly effective in relieving the stress imposed by the weld 300 at the seam 315 between counterplate 302 and sleeve 306.

Figure 3B:
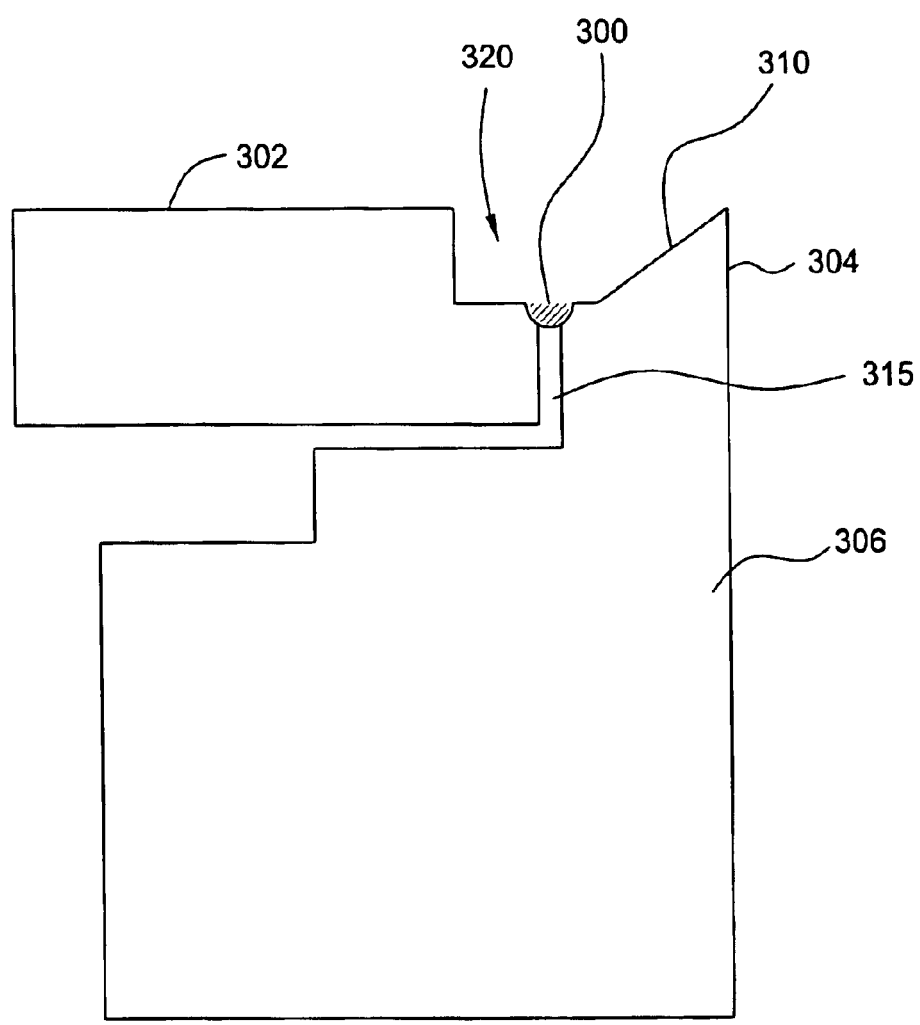

In an alternative shown in FIG. 3B, a groove 320 is cut into the interface between counterplate 302 and sleeve 306 at the gap or seam 315. In this case, rather than cutting a rectangular cross-sectional groove into the shoulder 304 of the sleeve 306, a cut which is at first a continuation of the cut imposed on the counterplate 302 and then gradually tapers 310 axially away to the outer edge of the shoulder 304 is provided. In this situation, the diminishing of the stress created at the weld 300 is still achieved, while the groove 320 is somewhat easier to fabricate under certain circumstances.

Figure 4A:
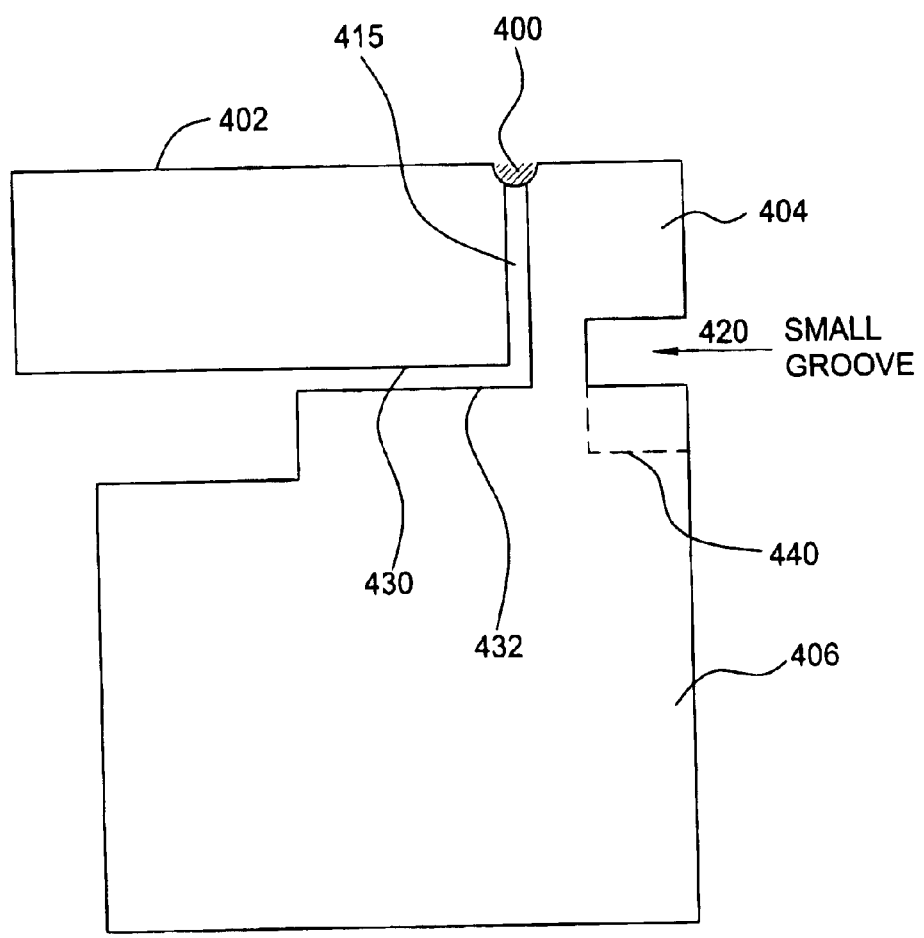

In yet another alternative shown in FIG. 4A, a small groove 420 is cut into the outer surface of the shoulder 404 of sleeve 406. No cut is made into the counterplate 402 in order to maintain its rigidity. This weakening of the shoulder 404 makes it easier to impose the weld 400 at the seam 415 between the counterplate 402 and the sleeve 406 without distortion of the counterplate 402 due to the forces imposed by heating and later contraction of the weld 400.

Groove 420 can be anywhere along the axially outer surface of shoulder 404; however, it is preferably imposed roughly along the plane where the lower edge 430 of the counterplate will rest on an upper surface 432 of the sleeve 406. As shown by the dotted lines 440, the groove 420 may be axially extended even below this imaginary line which is defined by this intersection between counterplate surface 430 and sleeve surface 432 to further weaken the sleeve and diminish the possibility of distortion.

Figure 4B:
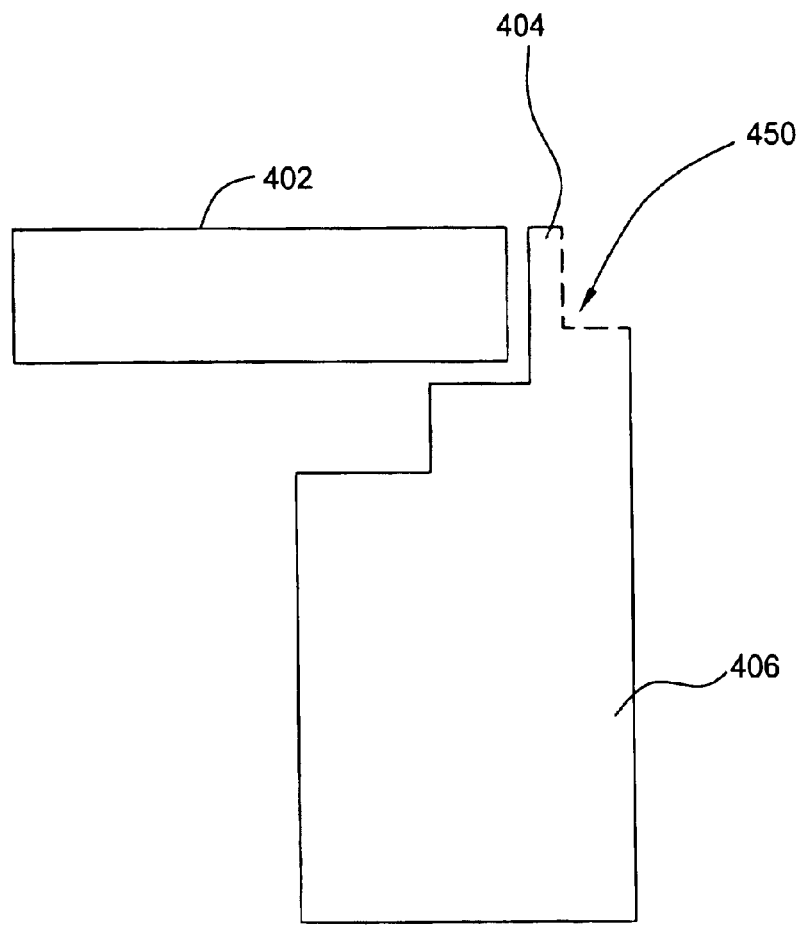

A further application of this same principle is shown in FIG. 4B where the outer edge region 450 of the sleeve 406 is cut away, again leaving the counterplate 402 undisturbed. The axial depth of this cut, or cut-away portion 450 of the shoulder 404 need only be far enough to weaken shoulder 404; in an exemplary approach, it extends preferably at least half the axial depth of the counterplate 402 in order to diminish the radial forces imposed on the counterplate 402 which could bow the counterplate 402.

Figure 5:
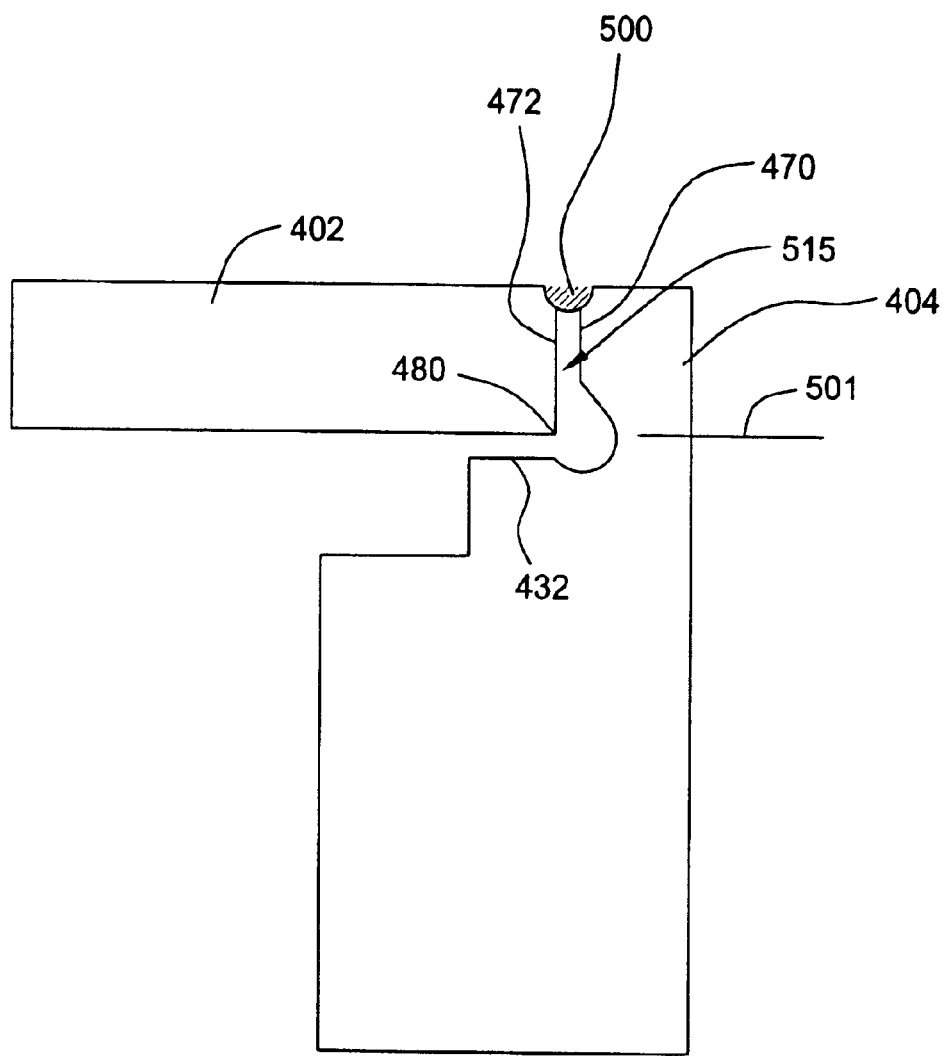

Yet another approach to the solution to this problem is what is referred hereto as an undercut 501 shown in FIG. 5. In this figure, an undercut region 501 eliminates a portion of the junction between the inner surface 470 of shoulder 404 and the radially outer wall 472 of counterplate 402. This undercut 501 preferably starts from what would be the corner where the outer corner 480 of the counterplate 402 would rest against the corner defined by the inner surface 470 and the surface 432 of the sleeve 406 on which the counterplate 402 rests. This also has the effect of reducing the stress imposed by the weld 500 on the seam 515 by both weakening the shoulder 404 so as to provide less resistance to the contraction of the weld 500, as well as diminishing the amount of surface contact between the inner surface 470 of the sleeve 406 and the radially outer surface 472 of the counterplate 402.

Other features and advantages of this invention will be apparent to a person of skill in the art who studies the disclosure provided above. Therefore, the scope of the present invention is to be limited only by the following claims.

What is claimed is:

1. A spindle motor for use in a disk drive comprising:
   a shaft supporting a thrust plate at one end thereof;
   a sleeve surrounding the shaft and being rotatable relative to the shaft and supporting a hub on the outer surface thereof, the sleeve having a surface adjacent the thrust plate, and the sleeve cooperating with the shaft to define a journal bearing and with the thrust plate to define a first fluid dynamic thrust bearing;
   a counterplate welded to an upraised axial shoulder of the sleeve and having a surface located adjacent a surface of the thrust plate to define at least a second fluid dynamic thrust bearing;
   fluid within the first and second thrust bearings and the journal bearing supporting relative rotation of the shaft and sleeve; and
   a groove region defined in the shoulder of the sleeve radially aligned with the counterplate to radially weaken the sleeve.

2. A spindle motor as claimed in claim 1 wherein the groove region extends at least part way axially into the radially inner portion of the sleeve shoulder.

3. A spindle motor as claimed in claim 2 wherein the groove region additionally extends into the radially outer surface of the counterplate.

4. A spindle motor as claimed in claim 2 wherein the grooved region extends to about half the counterplate thickness.

5. A spindle motor as claimed in claim 1 wherein the groove region is cut into the radially outer surface of the shoulder of the sleeve in a region near to a gap between the counterplate and the sleeve.

6. A spindle motor as claimed in claim 5 wherein the groove region is of a dimension which is approximately half the width of the counterplate.

7. A spindle motor as claimed in claim 1 wherein the groove region extends axially down the radially outer surface of the shoulder of the sleeve.

8. A spindle motor as claimed in claim 7 wherein the groove region has an axial dimension equal to about half the axial depth of the counterplate.

9. A spindle motor as claimed in claim 1 wherein the groove region extends radially away from the counterplate into the sleeve, and extends from a point near to the junction between the radial and axial walls of the sleeve wall approximately part way toward the upper axial surface of the arm.

10. A spindle motor as claimed in claim 9 wherein the groove region is about half the axial width of the sleeve wall and about half the axial extent of the counterplate.

11. A spindle motor as claimed in claim 3 wherein the radially outer wall of the groove is tapered toward the radially outer wall of the shoulder.

12. A fluid dynamic bearing comprising a shaft supporting a thrust plate at one end thereof, a sleeve surrounding the shaft and being rotatable relative to the shaft and supporting a hub on the outer surface thereof, the sleeve having a surface adjacent the thrust plate and cooperating with the shaft to define a journal bearing and with the thrust plate to define a first fluid dynamic thrust bearing, a counterplate welded to an upraised axial wall of the sleeve and having a surface located adjacent a surface of the thrust plate to define at least a second fluid dynamic thrust bearing, fluid within the first and second thrust bearings and the journal bearing supporting relative rotation of the shaft and sleeve, and a groove defined in an arm of the sleeve aligned with the counterplate to radially weaken the sleeve.

13. A bearing as claimed in claim 12 wherein the groove extends at least part way axially into the radially inner portion of the sleeve arm.

14. A bearing as claimed in claim 13 wherein the groove additionally extends along the radially outer surface of the counterplate.

15. A bearing as claimed in claim 12 wherein the groove extends axially down the radially outer surface of the sleeve arm.

16. A bearing as claimed in claim 15 wherein the groove has an axial extent equal to about half the axial depth of the counterplate.

17. A bearing as claimed in claim 12 wherein the groove extends radially away from the counterplate into the sleeve, and extends from a point near to the junction between the radial and axial walls of the sleeve wall approximately part way toward the upper axial surface of the arm.

18. A bearing as claimed in claim 17 wherein the groove is about half the axial width of the sleeve arm and about half the axial extent of the counterplate.

19. A bearing as claimed in claim 12 wherein the radially outer wall of the groove is tapered toward the radially outer wall of the shoulder.

20. A fluid dynamic bearing comprising a shaft supporting a thrust plate at one end thereof, a sleeve surrounding the shaft, and rotatable relative to the shaft and supporting a hub on the outer surface thereof, the sleeve having a surface adjacent the thrust plate and cooperating with the shaft to define a journal bearing and with the thrust plate to define a first fluid dynamic thrust bearing, a counterplate welded to an upraised axial shoulder of the sleeve and having a surface located adjacent a surface of the thrust plate to define at least a second fluid dynamic thrust bearing, fluid within the first and second thrust bearings and the journal bearing supporting relative rotation of shaft and sleeve, and means defined in the upraised axial shoulder for weakening the radial stiffness of the shoulder.

* * * * *